(12) United States Patent
Hande et al.

(10) Patent No.: US 11,095,597 B2
(45) Date of Patent: Aug. 17, 2021

(54) PREDICTING SPREAD OF CONTENT ACROSS SOCIAL NETWORKS

(71) Applicant: Adobe Inc., San Jose, CA (US)

(72) Inventors: Sayaji Hande, Ghaziabad (IN); Vineet Gupta, Kanpur (IN); Sandeep Zechariah George Kollannur, Kochi (IN)

(73) Assignee: Adobe Inc., San Jose, CA (US)

( * ) Notice: Subject to any disclaimer, the term of this patent is extended or adjusted under 35 U.S.C. 154(b) by 1230 days.

(21) Appl. No.: 14/031,256

(22) Filed: Sep. 19, 2013

(65) Prior Publication Data

US 2015/0081609 A1      Mar. 19, 2015

(51) Int. Cl.
*G06N 5/04* (2006.01)
*H04L 12/58* (2006.01)
*G06Q 50/00* (2012.01)

(52) U.S. Cl.
CPC ............ *H04L 51/32* (2013.01); *G06Q 50/01* (2013.01); *G06N 5/04* (2013.01)

(58) Field of Classification Search
None
See application file for complete search history.

(56) References Cited

PUBLICATIONS

Backstrom, et al., Supervised Random Walks—Predicting and Recommending Links in Social Networks, WSDM'11, 2011, pp. 1-10.*
Zhang, et al., Predicting Purchase Behaviors from Social Media, International World Wide Web Conference Committee (IW3C2), May 13-17, 2013, pp. 1521-1531 (Year: 2013).*
Backstrom, et al., Supervised Random Walks—Predicting and Recommending Links in Social Networks, WSDM'11, 2011, pp. 1-10 (Year: 2011).*
Acemoglu, et al., "Diffusion of Innovations on Social Networks", IEEE Conference on Decision and Control, Orlando, FL, Dec. 2011., Dec. 2011, 6 pages.
Aral, et al., "Creating social contagion through viral product design: A randomized trial of peer influence in networks", Management Science, 2010, Nov. 2010, 34 pages.
Backstrom, et al., "Group Formation in Large Social Networks: Membership, Growth, and Evolution", KDD, 2006., 2006, 11 pages.
Bass, "A New Product Growth for Model Consumer Durables", Management Science,15(5): Jan. 1969, Jan. 1969, 14 pages.
Domingos, et al., "Mining the Network Value of Customers", Seventh International Conference on Knowledge Discovery and Data Mining, 2001., 2001, 10 pages.
Iyengar, et al., "Opinion Leadership and Social Contagion in New Product Diffusion", Marketing Science, 30(2): Mar. 2011, Mar. 2011, pp. 195-212.
Kempe, et al., "Maximizing the Spread of Influence through a Social Network", SIGKDD, 2003., 2003, 10 pages.
Kleinberg, "Cascading behavior in networks: Algorithmic and economic issues", Algorithmic Game Theory, edited by Boam Nisan et al; Cambridge University Press, 2007., 2007, 20 pages.

(Continued)

*Primary Examiner* — Wilbert L Starks
(74) *Attorney, Agent, or Firm* — FIG. 1 Patents

(57) ABSTRACT

This document describes techniques for predicting spread of content across social networks. In various embodiments, user interactions with content posted to a social network are accessed during a first stage. The accessed user interactions are applied to a prediction model to predict future user interactions with the content during one or more subsequent stages.

21 Claims, 9 Drawing Sheets

(56) References Cited

PUBLICATIONS

Myers, "Information Diffusion and External Influence in Networks", In Proceedings of the 18th ACM SIGKDD international conference on Knowledge discovery and data mining, ACM, 2012., 2012, 9 pages.

Valler, et al., "Epidemic spread in mobile ad hoc networks: Determining the tipping point", International IFIP TC 6 Networking Conference, Valencia, Spain, May 9-13, 2011, Proceedings, Part 1, vol. 6640 of Lecture Notes in Computer Science, Springer, 2011, May 2011, 15 pages.

Van et al., "A Viral Branching Model for Predicting the Spread of Electronic Word of Mouth", Marketing Science, 29(2): Mar. 2010, Mar. 2010, pp. 348-365.

Watts, "A Simple Model of Global Cascades on Random Networks", Proceedings of the National Academy of Sciences of the United States of America, vol. 99, No. 9, pp. 5766-5771, Apr. 30, 2002., Apr. 2002, pp. 5766-5771.

\* cited by examiner

PREDICTING SPREAD OF CONTENT ACROSS SOCIAL NETWORKS

BACKGROUND

Content posted to a social network can reach a user through the original source of the content, and through the user's connections in the social network. Social networks, therefore, play a major role in the spread of online content. Marketers and businesses would like to be able to predict the spread of content across a social network.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques for predicting spread of content across social networks. In various embodiments, user interactions with content posted to a social network during a first stage are accessed. The user interactions are applied to a prediction model to predict future user interactions with the content during one or more subsequent stages.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

This document describes techniques for predicting spread of content across social networks. In various embodiments, one or more parameters related to a page on a social network are received. In some cases, the received parameters include a population parameter that is related to a number of users subscribed to the page on the social network, and an average connections parameter that is related to an average number of connections of the users subscribed to the page on the social network.

User interactions with content posted to the page on the social network during a first stage are accessed. For example, the content can include a post, a picture, or a video, and the user interactions can include one or more of views of the content, clicks on the content, replies to the content, likes of the content, shares of the content, or retweets of the content.

The received parameters and the user interactions are applied to a prediction model to predict future user interactions with the content in one or more subsequent stages. In one or more embodiments, the prediction model can predict the future interactions with a ratio of 1:n, meaning that for every one stage of accessed user interactions, n stages of future interactions can be predicted. In some cases for every one stage of accessed user interactions, approximately nine stages of future user interactions can be predicted with a low error rate. For example, if user interactions with the content during a first hour are accessed, future user interactions with the content can be predicted for the next nine hours. Further, the prediction model can generate the prediction without any knowledge of the subject matter of the content or information regarding the social network.

In the following discussion, an example environment is first described that may employ the techniques described herein. An example procedure is then described which may be performed in the example environment as well as other environments. Consequently, performance of the example procedure is not limited to the example environment and the example environment is not limited to performance of the example procedure.

Example Environment

Figure 1:
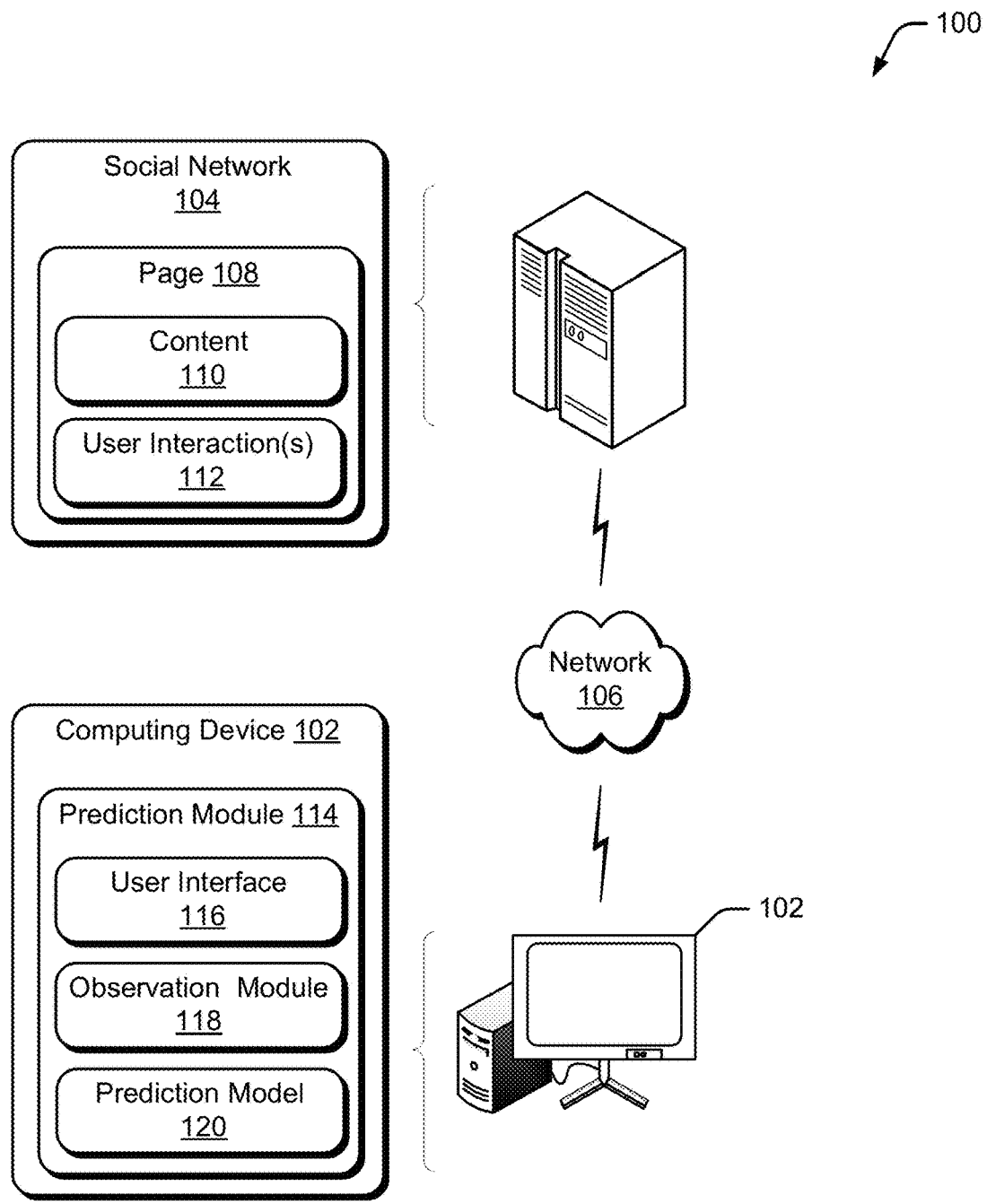
FIG. 1 illustrates an environment in an example implementation that is operable to employ techniques described herein.

FIG. 1 illustrates an environment 100 in an example implementation that is operable to employ techniques described herein. Environment 100 includes a computing device 102 and a social network 104 that are communicatively coupled via a network 106. Computing device 102 and social network 104 may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 7.

Although network 106 is illustrated as the Internet, the network may assume a wide variety of configurations. For example, network 106 may include a wide area network (WAN), a local area network (LAN), a wireless network, a public telephone network, an intranet, and so on. Further, although a single network 106 is shown, network 106 may also be configured to include multiple networks.

Social network 104 provide an interface (not shown) for multiple users to interact with a social network community over network 106. As described herein, a social network may include blogs and online forums, social media sharing services, social networking services, and social news services.

Social media sharing services can include video services (e.g., YouTube® and Vimeo®), photo services (e.g., Flickr®, Picasa®, and Instagram®), audio services (e.g., Pandora® and LastFM®), and bookmark services (e.g., StumbleUpon® and Delicious®). Example of social networking services include Facebook®, Google+®, Twitter®, LinkedIn®, Plurk®, and Xing®. Examples of social news services include Digg® and Reddit®.

Social network 104 includes multiple page(s) 108, which may correspond to a particular individual, company, or brand. As described herein, a page includes any type of page, handle, or identity that can be followed or subscribed to by users in social network 104. Users that "subscribe" to a page include users that subscribe to, follow, or are fans of any type of page on any type of social network. For example, Facebook® users can be "fans" of a company's page, whereas Twitter® users can follow a company's Twitter® "handle".

Content 110 can be posted to page 108 on social network 104 to enable users that subscribe to page 108 to view and interact with the content. Content 110, for example, can include videos, pictures, blog posts, and short-text posts. Content 110 that is posted to page 108 on social network 104 is stored on servers of social network 104.

User interactions 112 with content 110 posted to social network 104 can also be recorded and stored on servers of social network 104. User interactions 112 can include any response by users of the social network community to content 110, including responding to or commenting on content 110, liking, disliking, or loving content 110, retweeting content 110, sharing content 110, favoriting content 110, clicking on content 110, emailing content 110, or any other tangible and measurable response to content 110. The user interactions may correspond to the total number of user interactions, or to the number of unique users that interacted with the content.

Computing device 102 is illustrated as including a prediction module 114 which is configured to predict the future spread of content 110 across social network 104. Prediction module 114 includes a user interface 116, an observation module 118, and a prediction model 120. User interface 116 receives one or more parameters related to page 108, and observation module 118 accesses user interactions 112 with content 110 posted to page 108 on social network 104 during a first stage. Prediction module 114 applies the one or more parameters and the accessed user interactions 112 to prediction model 120 to predict future user interactions with content 110 during one or more subsequent stages. Further discussion of the functionality of prediction module 114 is discussed below.

Figure 7:
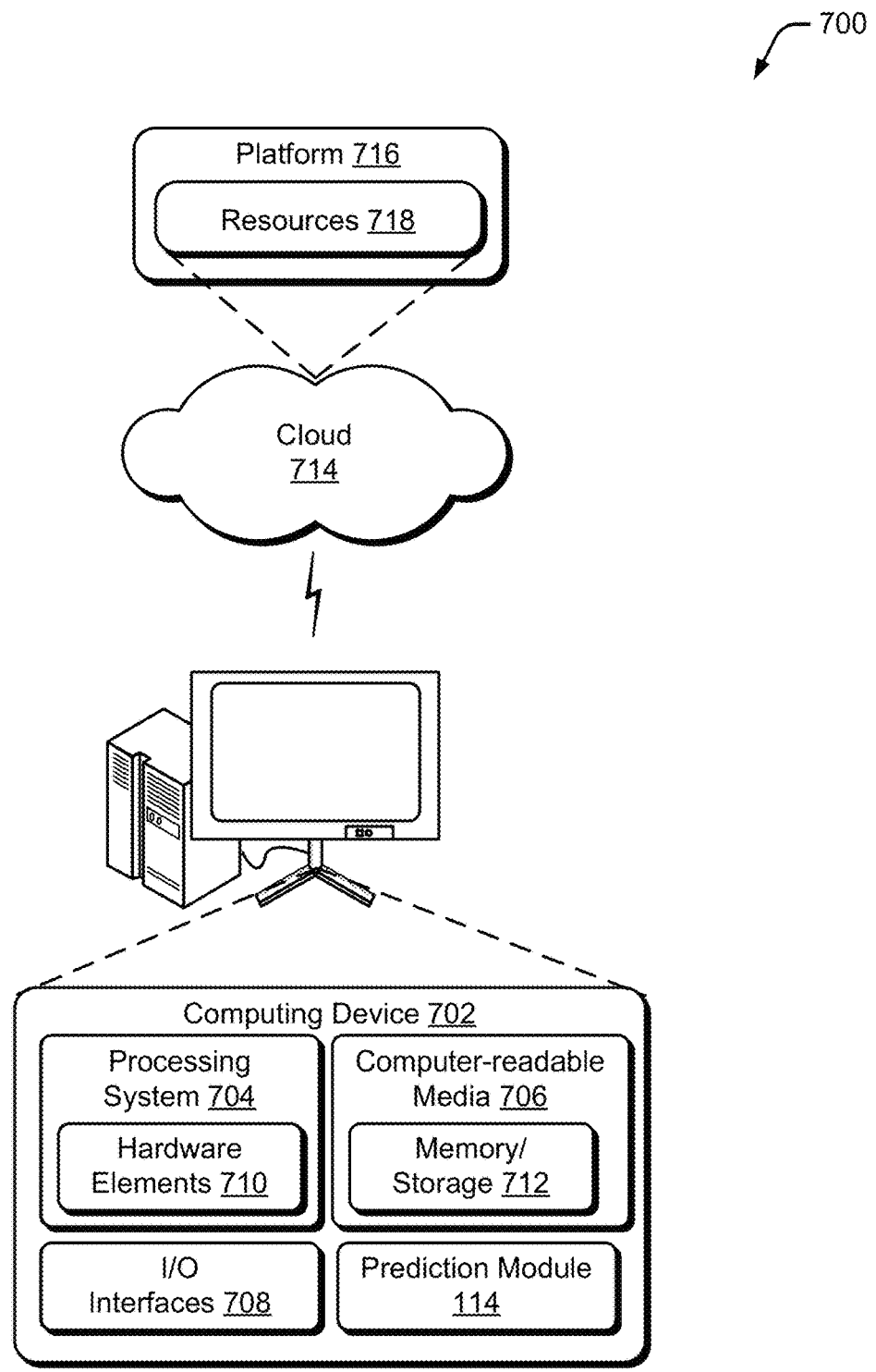
FIG. 7 illustrates an example system including various components of an example device that can be implemented as any type of computing device as described and/or utilized with reference to FIGS. 1-6 to implement embodiments of the techniques described herein.

Although illustrated as part of computing device 102, functionality represented by prediction module 114 may be further divided, such as to be performed "over the cloud" by one or more servers that are accessible via network 106, further discussion of which may be found in relation to FIG. 7.

Figure 2A:
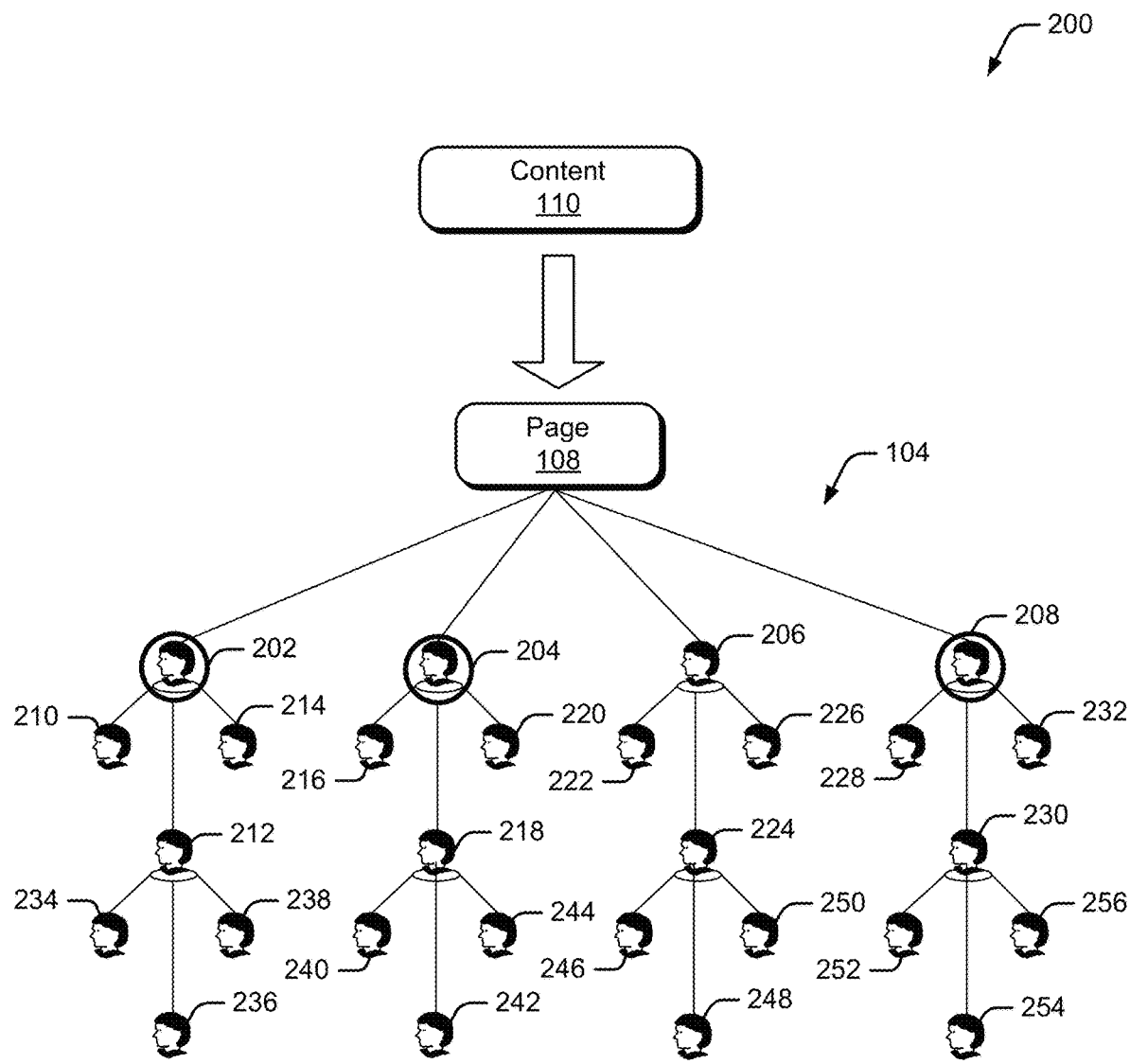
FIG. 2a illustrates an example of a first stage of content spread in a social network.

FIG. 2a illustrates an example 200 of a first stage of content spread across social network 104. In this example page 108 on social network 104 is subscribed to by users 202, 204, 206, and 208. Page 108 may be a page, handle, or any other type of platform on social network 104. Thus, when content 110 is posted to page 108 on social network 104, content 110 may be directly visible to users 202, 204, 206, and 208. For example, if the users are fans of page 108 on Facebook®, the posted content may show up in each of the user's news feeds.

As described herein, a user is "infected" by content when the user interacts with the content, such as by liking the content, viewing the content, or commenting on the content. In this example, users 202, 204, and 208 are infected because these users have interacted with content 110. This is indicated in FIG. 1a by the circle drawn around users 202, 204, and 208.

In this example, each of users 202, 204, 206, and 208 are directly connected, via social network 104, to three additional users. User 202 is connected to users 210, 212, and 214, user 204 is connected to users 216, 218, and 220, user 206 is connected to users 222, 224, and 226, and user 208 is connected to users 228, 230, and 232. Thus, if one of users 202, 204, 206, or 208 interacts with content 110 posted to page 108 of social network 104, the user's connections may be able to see this interaction. For example, if user 202 "likes" content 110, users 210, 212, and 214 may be notified (such as in each user's newsfeed) that user 202 liked the content. When a user is notified that one of the user's connections interacted with content 110, then the user may also be influenced to interact with content 110. For example, if user 202 likes content 110, then users 210, 212, and/or 214 may be influenced to also like content 110.

A probability of a user interacting with the content during a particular stage can be calculated as the number of users that interacted with the posted content divided by the population of users that could have interacted with the content. In the first stage, the population of users that could have interacted with the content may be related to the number of users that subscribe to a particular page. For example, in FIG. 2a the probability of a user interacting with the content during the first stage is 75%, because out of four users subscribed to page 108 (users 202, 204, 206, and 208), three of the users interacted with content 110 (users 202, 204, and 208).

Figure 2B:
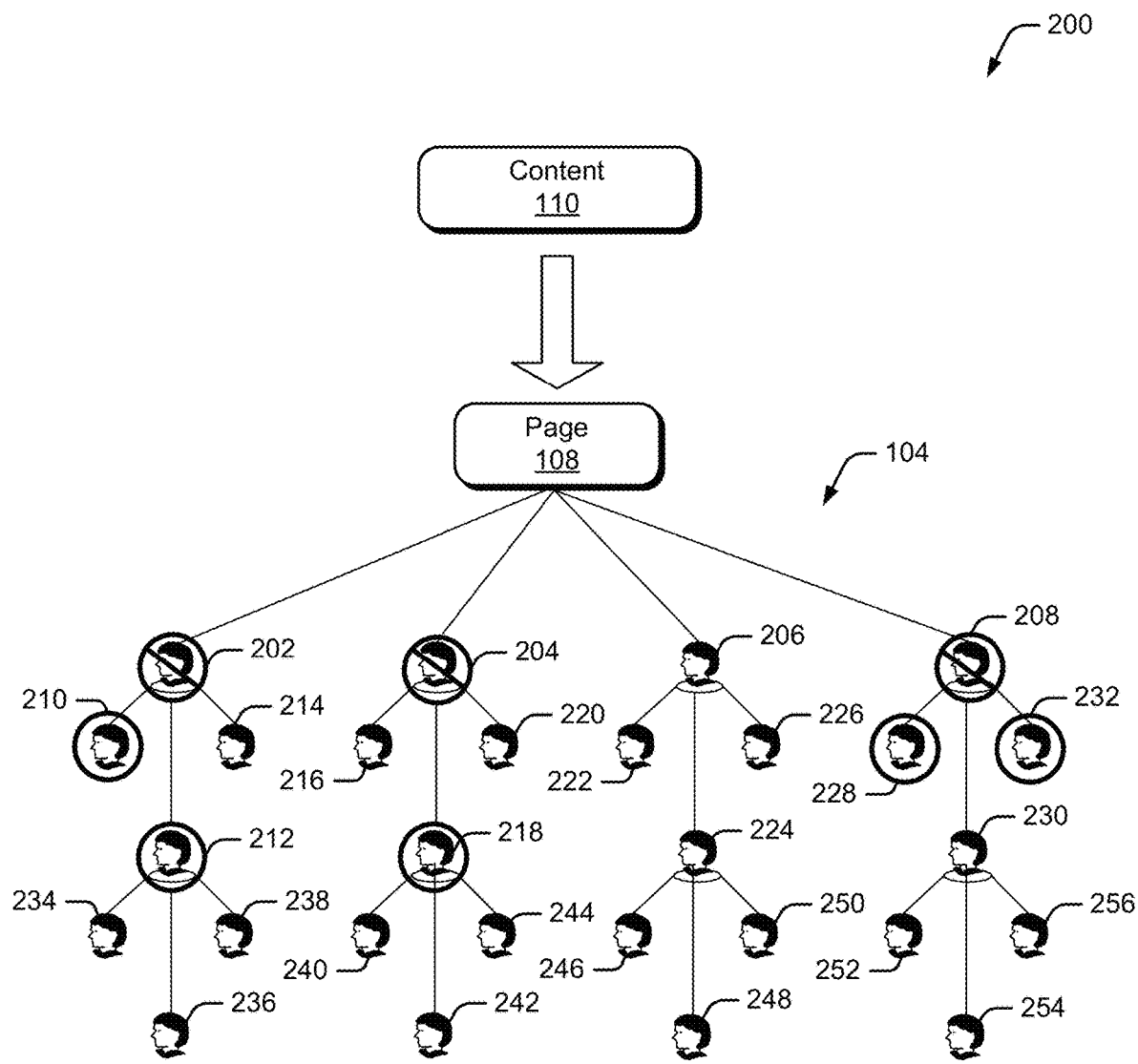
FIG. 2b illustrates an example of a second stage of content spread in a social network.

FIG. 2b illustrates an example 200 of a second stage of content spread across social network 104. In this example, user 202 has influenced users 210 and 212 to interact with content 110, user 204 has influenced user 218 to interact with content 110, and user 208 has influenced users 228 and 232 to interact with content 110. In this example, users 202, 204, and 208 are now "killed", which is indicated by the slash drawn through the circles around users 202, 204, and 208. As described herein, a user is "killed" when they no longer have the ability to infect others users. For example, after a certain period of time has elapsed, the fact that users 202, 204, and 208 interacted with content 110 may no longer show up in the news feeds of their connections. Of course, users 202, 204, and 208 may still be able to influence other users to interact with content 110 after this time period has passed, but it is increasingly less likely.

In the second stage, the population of users may correspond to the number of users that are directly connected to a user that subscribes to page 108. Thus, in FIG. 2b, the probability of a user interacting with the content during the second stage is approximately 42% because out of twelve possible users connected to the users that subscribe to page 108 (users 210-232), five of the users interacted with content 110 (users 210, 212, 218, 228, and 232).

Figure 2C:
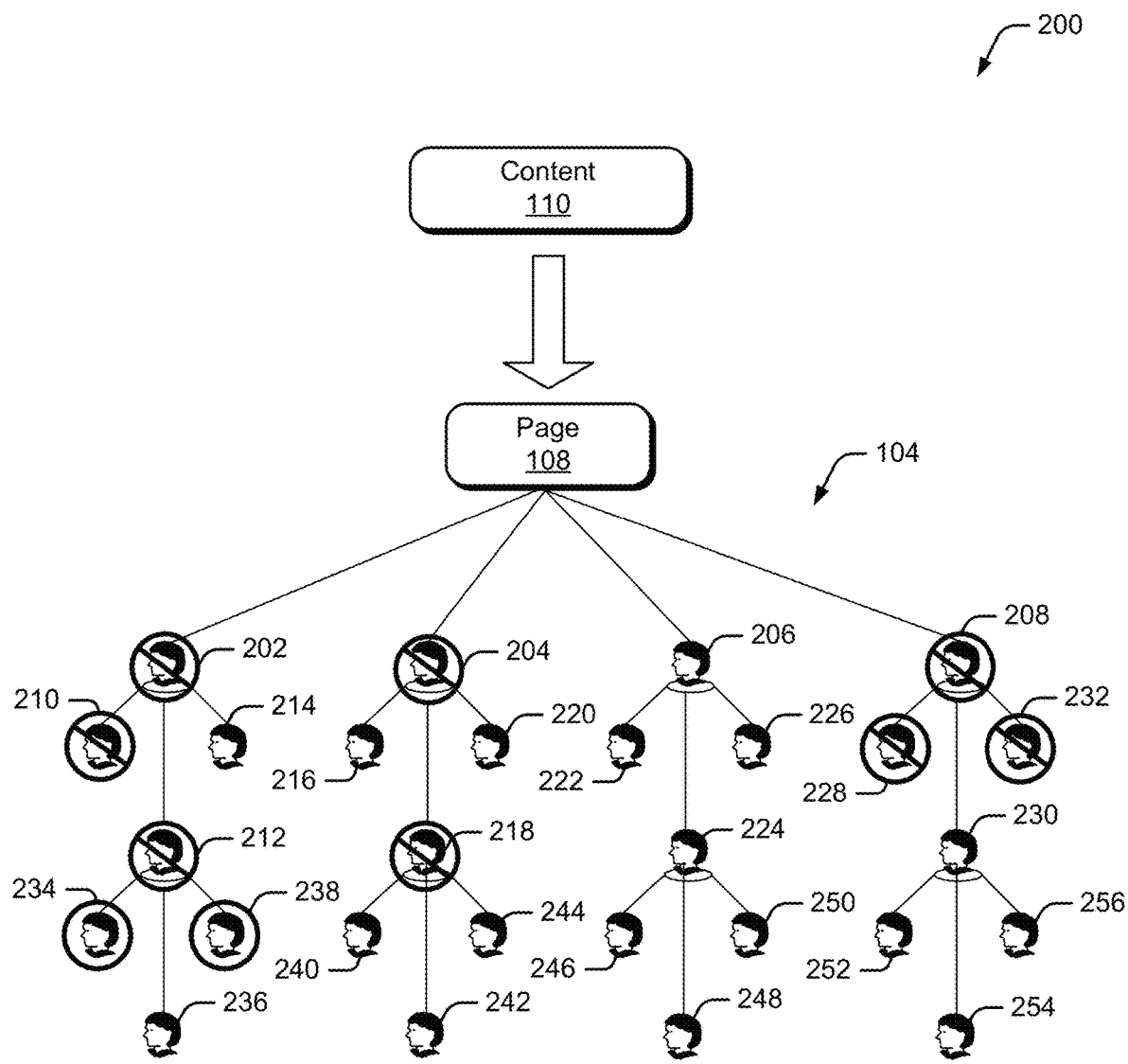
FIG. 2c illustrates an example of a third stage of content spread in a social network.

FIG. 2c illustrates an example 200 of a third stage of content spread across social network 104. In this example, user 212 has influenced users 234 and 238 to interact with content 110, and is now killed. Users 210, 218, 228, and 232 are also killed without influencing any of their connections. In the second stage, the population of users may correspond to the number of users that are connected to a connection of a user that subscribed to page 108. Thus, in FIG. 2c, the probability of a user interacting with the content during the third stage is approximately 17% because out of twelve possible users connected to a connection of the users that subscribe to page 108 (users 234-256), just two of the users interacted with content 110 (users 234 and 238).

Note that as the stage number increases the non-infected population of users decreases. Further, this non-infected population of users may have already come under an attempt of early infections. These factors may contribute to cause the probability of a user interacting with the content to decrease as the stage number increases.

In view of FIGS. 2a, 2b, and 2c, consider that at least three factors may influence the number of user interactions with content 110: the probability of a user interacting with the content during the first stage, the number of users in the population, and an average number of connections of users in the population.

The probability of a user interacting with the content during the first stage impacts the probability of a user interacting with the content during subsequent stages (and thus the total number of user interactions) because individuals that interact with content at a particular stage are able to influence their connections at subsequent stages. For example, because user 206 did not interact with content 110 in the first stage, users 222, 224, 226, 246, 248, and 250 are not influenced to interact with content 110.

The number of users in the population also impacts the total user interaction because the more users that are subscribed to a page impacts the number of possible users that may interact with the content. For example, in FIG. 2, there are just four users subscribed to page 108 which impacts the total number of user interactions.

The average number of connections of users that subscribe to a page also impacts the total interaction because the more connections a subscriber has increases the number of users the subscriber may be able to influence to interact with content. For example, in FIG. 2, there are just three users connected to each user subscribed to page 108, which impacts the total number of user interactions.

Figure 3:
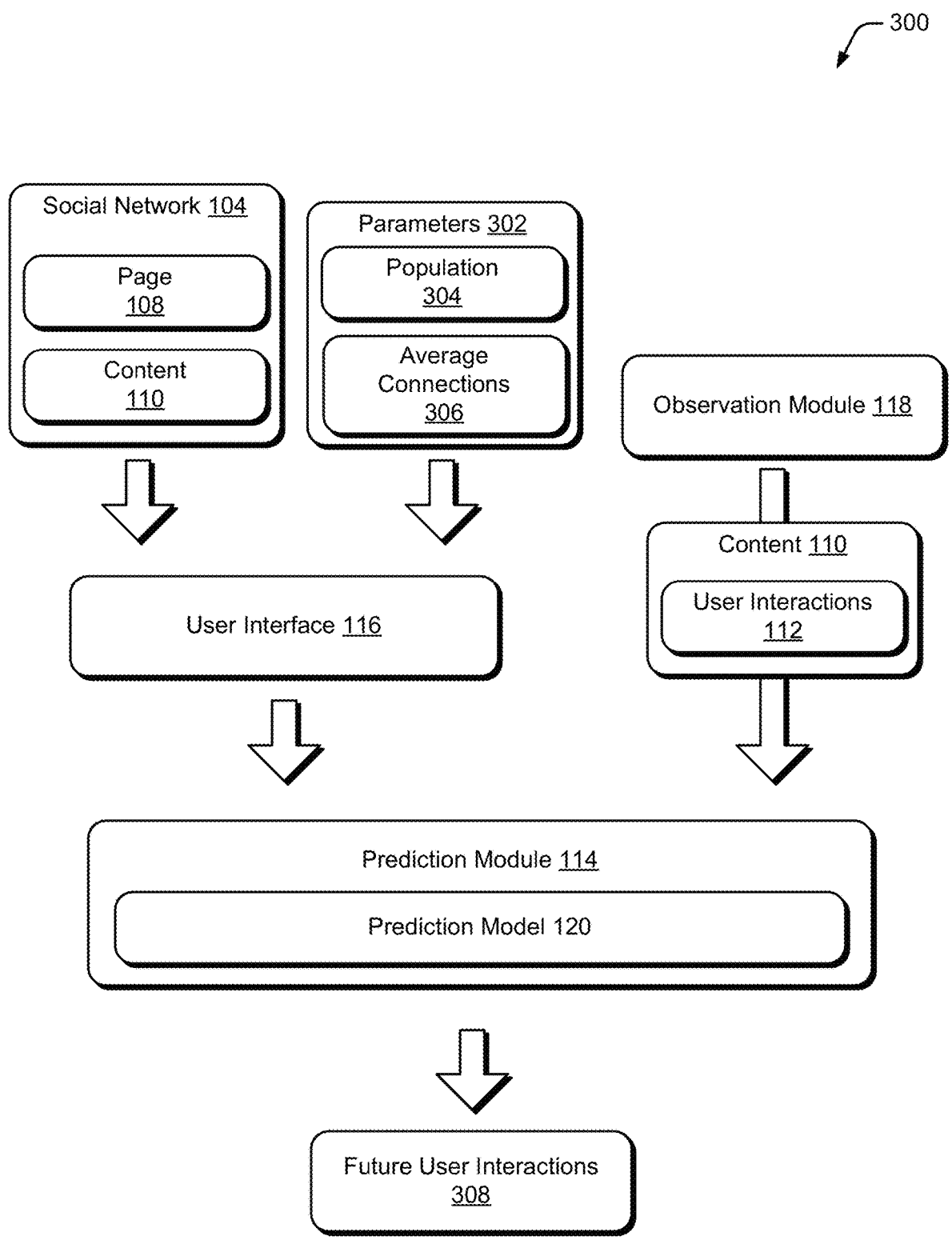
FIG. 3 illustrates a system in an example implementation in which future user interactions with content posted to a social network are predicted using a prediction model.

FIG. 3 illustrates a system 300 in an example implementation in which future user interactions with content 110 posted to page 108 on social network 104 are predicted using prediction model 120.

In this example, content 110 posted to page 108 on social network 104 is selected via user interface 116 of prediction module 114. In addition, parameters 302 regarding features of page 108 are received via user interface 116. In this example, parameters 302 include a population parameter 304 and an average connections parameter 306.

Population parameter 304 may be related to a number of users that are subscribed to page 108 on social network 104. For example, in FIG. 2, the population parameter may be four because four users are subscribed to page 108. Alternately, population parameter 304 may correspond to the maximum number of users that can be reached when content 110 is posted to page 108 on social network 104. In other words, the population parameter may include both the total number of users subscribed to page 108 and the total number of users that are connected to the users subscribed to page 108.

Average connections parameter 306 is related to the average number of connections of users in social network 104. In some cases, the average connections parameter corresponds to the average number of connections of the users that subscribe to page 108 on social network 104. For example, average connections parameter 306 may indicate the average number of friends of each user subscribed to a particular page on Facebook®, or the average number of followers of each user that follows a particular handle on Twitter®. In FIG. 2, for example, the average connections parameter is three because each of users 202, 204, 206, and 208 has three connections.

Both population parameter 304 and average connections parameter 306 are customizable by the user. Therefore, it may not be necessary for the user to know the exact number of the population or the average connections in order for the prediction model to predict future interactions. Further, based on past experiences using prediction model 120, the user can choose an appropriate number for the population parameter and the average connections parameter to generate the predicted interactions. In other words, if the predicted interactions end up being off from the actual interactions, the user can adjust these parameters the next time that the user generates predicted interactions using prediction model 120.

Figure 4:
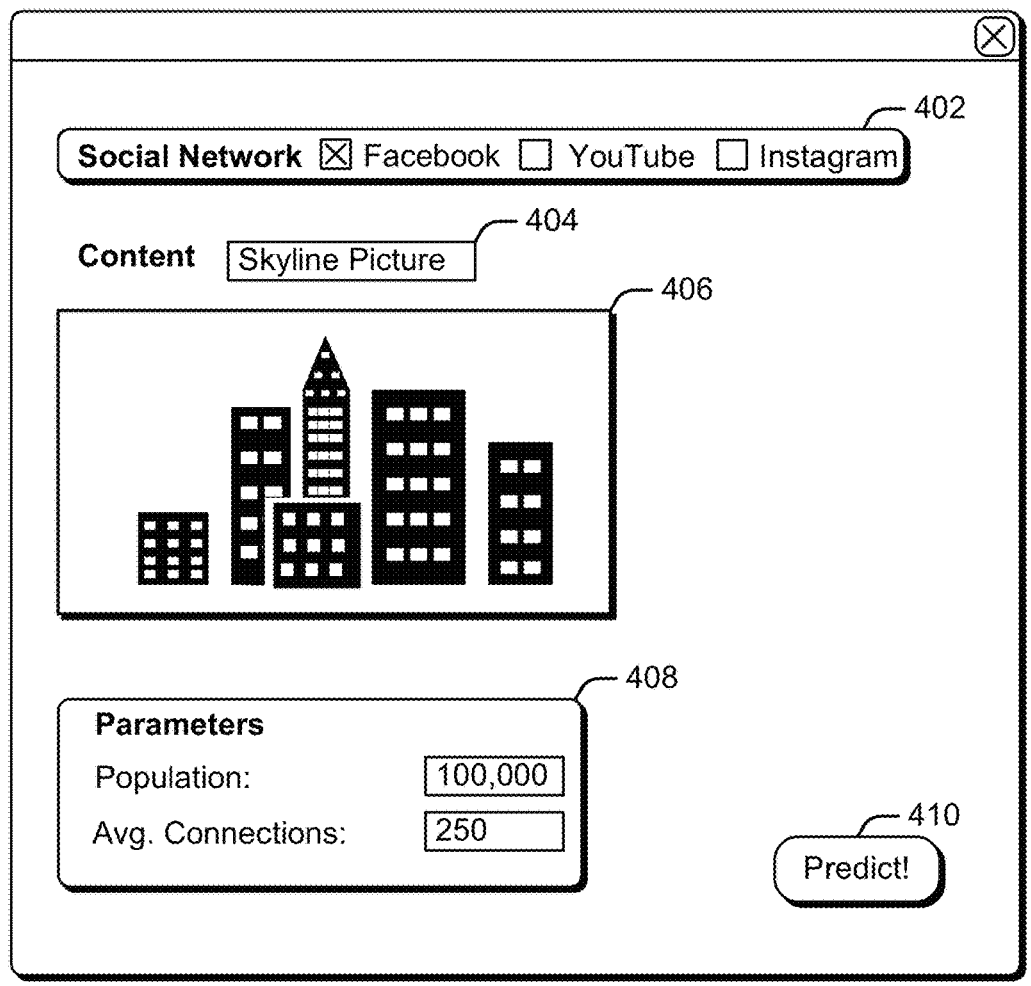
FIG. 4 illustrates an example user interface in accordance with one or more implementations.

As an example of user interface 116, consider FIG. 4 which illustrates an example of user interface 116. In this example, user interface 116 includes a social network control 402 that enables a user to select one of multiple different social networks, which in this example includes Facebook®, YouTube®, and Instagram®. The user, in this case, has selected Facebook® from social network control 402.

User interface 116 also includes a content control 404 that enables the user to select the particular content 110 posted to page 108 on social network 104 for which the user would like to generate the prediction, and a preview control 406 which displays a preview of the selected content. In this example, the user has selected a "Skyline Picture" that was posted to a particular page on Facebook®. It is to be appreciated that user interface 116 may be customized to a particular page, so that content control 404 lists, such as in a dropdown menu, all of the content that has been posted to the particular page on the selected social network. The user can then scroll through the posted content to select the particular content for which the prediction is to be generated.

User interface 116 further includes a parameters control 408 that enables the user to set the parameters that will be used to generate the prediction. In this case, parameter control 408 enables the user to customize the population of the page of the selected social network as well as the average number of connections of users that are subscribed to the page. The user has set the population parameter at 100,000, and the average number of connections parameter at 250.

Returning to FIG. 3, user interactions 112 with content 110 during a first stage are accessed by observation module 118. The first stage may correspond to an initial duration of time after content 110 is posted to social network 104. The initial duration of time may correspond to any amount of time. For example, the first stage may correspond to the first 30 minutes after a picture is posted to Facebook®, or to the first week after a video is posted to YouTube®.

In some cases, observation module 118 accesses or collects user interactions 112 with content 110 responsive to user input. For example, after inputting parameters into user interface 116, the user can select a prediction control 410 that causes user interactions 112 to be retrieved from servers associated with social network 104.

Parameters 302 and user interactions 112 are then applied to prediction model 120 by prediction module 114 to cause prediction model 120 to predict future user interactions 308 with content 110 during one or more subsequent stages.

Figure 5:
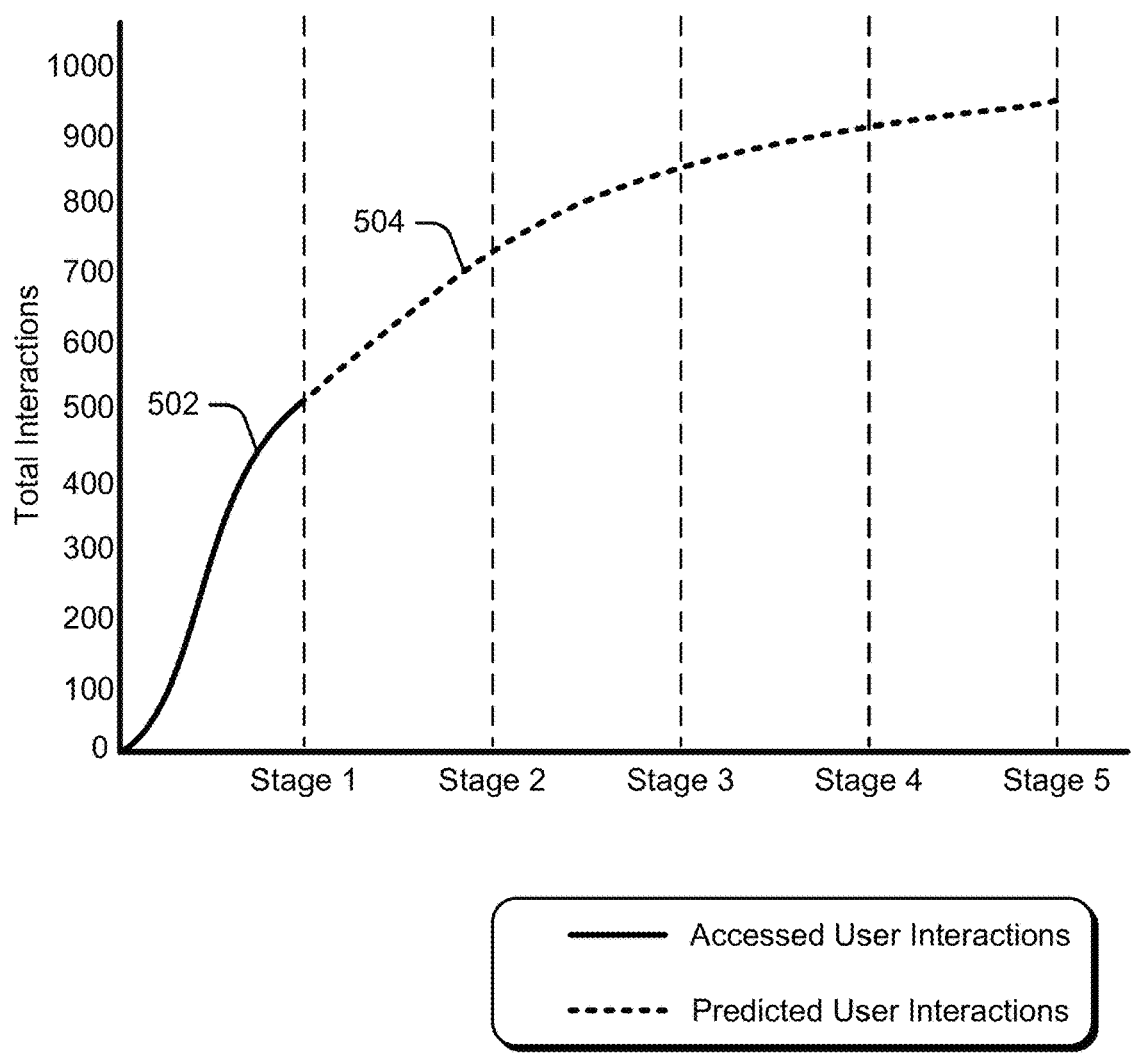
FIG. 5 illustrates an additional example user interface in accordance with one or more implementations.

As an example, consider FIG. 5 which illustrates an additional example of user interface 116 displaying predicted future user interactions. In this example, user interface 116 displays accessed user interactions 502 with content 110 posted to page 108 on social network 104 during a first stage, which is illustrated by the solid line. In this case, content 110 received 500 user interactions during the first stage. As described, throughout, the first stage may correspond to any duration of time, such as ½ hour, 1 hour, 1 day, or 1 week.

User interface 116 also displays predicted future user interactions 504 for one or more subsequent stages, which in this example is illustrated by the dashed line. Note that future user interactions 504 indicate a predicted number of user interactions at multiple different stages. For example, future user interactions 504 predicts that at a second stage, there will have been approximately 700 user interactions, at a third stage there will have been approximately 800 user interactions, and so on. In this example, only four stages are predicted. In one or more embodiments, however, approximately nine different stages can be predicted within an acceptable error rate.

The predicted future user interactions can be rendered for the user in a variety of different ways. For example, in some cases the predicted interactions may simply be a table listing the number of predicted future user interactions for each stage.

Further, it is to be appreciated that the user interactions may be customized to correspond to any type of user interaction. For example, in some cases the user interactions may include the number of multiple different types of user interactions, such as the total number of likes, comments, and shares on the social network. In other cases, the user interactions may be customized to correspond to a specific user interaction, such as only the total number of likes or only the total number of comments.

Additionally, the user interactions may correspond to the total number of user interactions, or to the number of unique users that interacted with the content. For example, in some cases a user may interact with content more than once, such as by liking the content and commenting on the content. In this case, these two user interactions may be counted as two separate interactions. Alternately, because only one unique user interacted with the content, these two user interactions may be counted as just one user interaction.

While prediction model 120 has been described as being configured to predict future user interactions with content posted to a social network, it is to be appreciated that prediction model 120 may also be used to predict other types of user interactions. For example, prediction model 120 may be implemented to predict user interactions to a movie release, an album release, or any other type of content where that are initial visible user interactions. For instance, prediction model can be implemented to predict cumulative revenue for a movie based on observed revenue during the first week after the movie is released.

Having discussed an example system, consider now an example implementation of prediction model 120.

Prediction Model

In various embodiments, prediction model 120 uses a recursive algorithm to predict future user interactions with content 110 posted to page 108 on social network 104 during one or more stages. As discussed above, prediction model 120 receives parameters, which may include a population parameter that is related to the number of users that subscribe to page 108, and an average connections parameter which is related to the average number of connections of the users subscribed to page 108.

Based on both the accessed user interactions 112 with content 110 during the first stage, and on the received parameters, the recursive algorithm can predict future user interactions with content 110 during multiple subsequent stages. For example, prediction model 120 can determine a first probability of a user interacting with content 110 during the first stage based on the accessed user interactions 112. In one or more embodiments, prediction model 120 then generates a trend of probabilities of a user interacting with content 110 in subsequent stages. The trend of probabilities can be generated using linear extrapolation or other similar techniques.

Next, prediction model 120 can determine, from the trend, a probability of a user interacting with content 110 during each of the subsequent stages. Finally, prediction model 120 predicts the number of user interactions with the content at each of the subsequent stages as a function of the population parameter and the probability of the user interacting with the content at each respective subsequent stage.

Prediction model 120 can predict the future user interactions with a ratio of approximately 1:n, meaning that for every one stage of accessed user interactions, n stages of future interactions can be predicted. It is to be appreciated that the error of the prediction may increase as n increases. In some cases, for every one stage of accessed user interactions with the content, approximately nine stages of future interactions with the content can be predicted within a low error rate. For example, if one hour of user interactions 112 with content 110 posted to page 108 on social network 104 is accessed, prediction model 120 can predict future user interactions with content 110 for each of the next nine hours. As another example, if one week of user interactions with a video posted to a video sharing network is accessed, prediction model 120 can predict future user interactions with the video for each of the next nine weeks.

The user may be able to control the error of the prediction by increasing the duration of the accessed user interactions. For example, an hour of accessed user interactions may lead to a more reliable prediction than 15 minutes of accessed user interactions. Further, in some cases, the user can control the duration of time corresponding to each stage. For example, if one hour of user interactions are accessed, the user can specify that the one hour of accessed user interactions corresponds to 1 stage, 2 stages, or 3 stages. It is to be appreciated that increasing the number of observed stages may decrease the error rate of the predicted user interactions.

Now, consider a recursive algorithm of prediction model 120 in accordance with one or more embodiments:

$$E(S_r) = N f_r$$

Where, the derived parameters are:

$$f_1 = g_1 = p_1 \text{ and } \lambda_1 = K p_1$$

For all $r > 1$, $f_r = (1 - e^{-\lambda_{r-1} p_r})(1 - g_{r-1})$ $g_r = f_r + g_{r-1}$ $\lambda_r = k f_r$ In this algorithm, the parameters are as follows:

$S_r$ is a random variable that indicates the number of users that interact with the content in an $r^{th}$ stage.

$E(S_r)$ is the number of expected user interactions in an $r^{th}$ stage.

$p_1$ is the probability of a user interacting with the original content during the first stage.

$p_r$ is the probability of a user being influenced to interact with the content at an $r^{th}$ stage by an already infected user ($r>1$).

N is the population parameter that is related to the number of users subscribed to the page.

$K_i$ corresponds to the number of connections of an $i^{th}$ user.

K is the average connections parameter that is related to the average number of connections of user subscribed to the page.

$f_r$ corresponds to the probability of a user interacting with the content during only an $r^{th}$ stage.

$g_r$ corresponds to the probability of a user interacting with the content during an $r^{th}$ stage or during a prior stage.

$\lambda_r = k f_r$

In order to understand the recursive algorithm of prediction model 120, consider that $p_1$ is the probability of a user interacting with original content 110 posted to page 108 on social network 104 during the first stage. This probability will depend on various parameters, such as the brand value of the page as well as the subject matter of the content posted to the page. However, because prediction model 120 accesses actual user interactions with the content during the first stage, the recursive algorithm does not need to factor in either the brand value of the page or the contents of the posted content when generating the prediction. If the population size is large, and the community is fairly homogeneous, the probability can be assumed to be $p_1$ for all users of the social network community in the first stage.

For the second stage, the users that interacted with content 110 in the first stage influence their connections to interact with the content. The target population in the second stage, therefore, includes the users that did not interact with content 110 in the first stage. A user may be influenced to interact with content 110 in the second stage if one or more of the user's connections interacted with the content in the first stage. Each of the users that interacted with content 110 in the first stage are armed with $p_2$ probability to infect their non-infected connections. Thus, if a user does not interact with content 110 in the first stage, and "x" of the user's connections are infected, the user will interact with content 110 in the second stage with probability $1-(1-p_2)^x$. This process goes on in subsequent r stages in a similar manner, and as discussed above, probability "$p_r$"s will get reduced as time passes and with further stages.

Thus, to predict future user interactions, note that the expected values are known for r=1, 2, 3, . . . 10. By accessing the user interactions during the first stage, $E(S_1)$ can be determined. Then, from $E(S_1)$, the values for $f_1$, $g_1$, $p_1$, can be determined. These values can be used to calculate $E(S_2)$, and from $E(S_2)$, the values for $f_2$, $p_2$, and $g_2$ can be determined, and so on.

Now, based on known $p_r$'s from the accessed user interactions during the first stage, a trending method such as linear extrapolation or other similar techniques can be used to calculate further values of $p_r$. Then, working backwards, future $f_r$'s can be calculated to find expected infections in the future, giving the trend. Once the future $f_r$'s are known, the expected interactions for each stage can be determined as $E(S_r) = N f_r$. Thus, prediction model 120 can be used to predict the probability of a user interacting with the content during future stages, which can be used to predict future interactions with content 110 posted to page 108 on social network 104.

Example Procedure

The following discussion describes techniques for predicting spread of content across a social network that may be implemented utilizing the systems and devices described herein. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
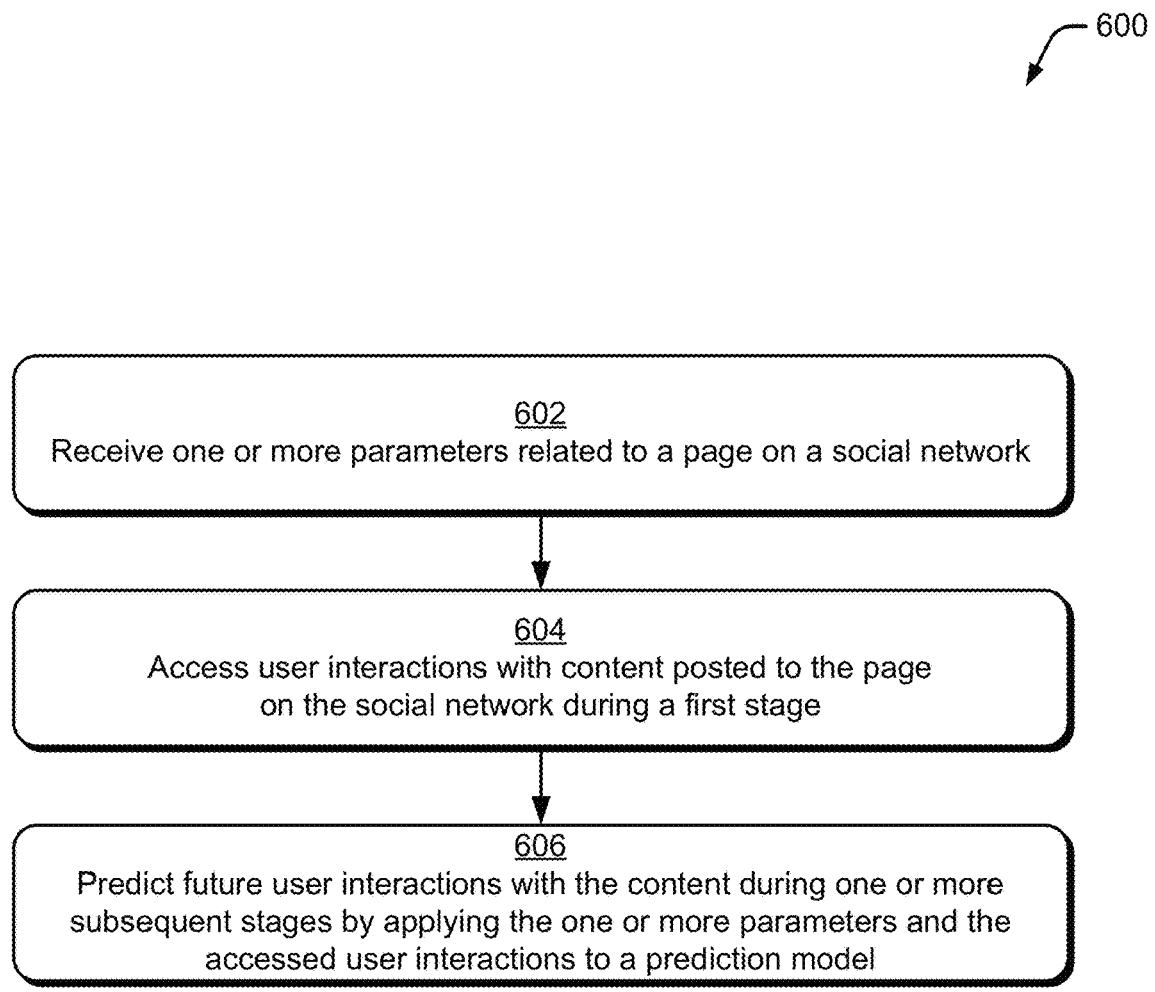
FIG. 6 illustrates a procedure in an example implementation in which user interactions with content posted to a social network are predicted using a prediction model.

FIG. 6 illustrates a procedure 600 in an example implementation in which a prediction model is used to predict the spread of content across a social network.

At 602, one or more parameters related to a page on a social network are received. For example, user interface 116 (FIG. 1) receives one or more parameters related to page 108 on social network 104. In one or more embodiments, the parameters include a population parameter that is related to a number of users subscribed to the page on the social network, and an average connections parameter that corresponds to an average number of connections of each user subscribed to the page on the social network.

At 604, user interactions with content posted to the page on the social network during a first stage are accessed. For example, observation module 118 accesses user interactions with content 110 posted to page 108 on social network 104 during a first stage.

At 606, future user interactions with the content during one or more subsequent stages are predicted by applying the one or more parameters and the accessed user interactions to a prediction model. For example, prediction module 114 predicts future user interactions with content 110 during one or more subsequent stages by applying the one or more parameters and the accessed user interactions to prediction model 120.

Having described example procedures in accordance with one or more implementations, consider now an example system and device that can be utilized to implement the various techniques described herein.

Example System and Device

FIG. 7 illustrates an example system generally at 700 that includes an example computing device 702 that is representative of one or more computing systems and/or devices that may implement the various techniques described herein. This is illustrated through inclusion of prediction module 114, which operates as described above. The computing device 702 may be, for example, a server of a service provider, a device associated with a client (e.g., a client device), an on-chip system, and/or any other suitable computing device or computing system.

The example computing device 702 is illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving at least one parameter related to a page on a social network;
accessing user interactions with content posted to the page on the social network during an initial duration of time after the content is posted to the page on the social network, the content comprising a short-text post, a picture, or a video, and the user interactions with the content comprising at least one of a view of the content or a share of the content; and
predicting future user interactions with the content during at least one subsequent duration of time by applying the received parameters and the accessed user interactions to a prediction model that is configured to predict the future user interactions based at least in part on a total number of the user interactions with the content during the initial duration of time, the future user interactions comprising at least one of viewing the content, clicking on the content, responding or commenting on the content, replying to responses to the content, liking the content, disliking the content, loving the content, sharing the content, or retweeting the content.

2. The computer-implemented method of claim 1, wherein the at least one parameter includes a population parameter that indicates a number of users subscribed to the page on the social network.

3. The computer-implemented method of claim 2, wherein the predicting further comprises:
determining, using the prediction model, a probability of a user interacting with the content during the at least one subsequent duration of time based at least in part on the accessed user interactions with the content during the initial duration of time; and
predicting, using the prediction model, a number of future user interactions with the content during the at least one subsequent duration of time as a function of the population parameter and a probability of the user getting infected at each respective subsequent duration of time.

4. The computer-implemented method of claim 1, wherein the prediction model includes a recursive algorithm.

5. The computer-implemented method of claim 1, wherein the at least one parameter related to the page on the social network includes an average connections parameter that indicates an average number of connections of each user subscribed to the page on the social network.

6. The computer-implemented method of claim 1, wherein the at least one subsequent duration of time comprises an amount of time that is equivalent to an amount of time in the initial duration of time.

7. The computer-implemented method of claim 1, wherein the predicting further comprises predicting future user interactions with the content during at least nine subsequent durations of time.

8. The computer-implemented method of claim 1, wherein the user interactions, with the content further comprise at least one of clicks on the content, replies to the content, likes of the content, or retweets of the content.

9. The computer-implemented method of claim 1, wherein the predicting further comprises predicting future user interactions with the content during at least two subsequent durations of time.

10. The computer-implemented method of claim 1, wherein the prediction model is further configured to predict the future user interactions based at least in part on a number of unique users that interacted with the content during the initial duration of time.

11. The computer-implemented method of claim 1, wherein the at least one subsequent stage comprises a same duration of time as the initial duration of time of the first stage.

12. One or more computer-readable storage media comprising instructions stored thereon that, responsive to execution by a computing device, cause the computing device to perform operations comprising:
receiving, via a user interface, parameters corresponding to a page on a social network, the parameters including at least a population parameter that indicates a number of users subscribed to the page on the social network and an average connections parameter that indicates an average number of connections of the users subscribed to the page;
accessing user interactions with content posted to the page on the social network during an initial duration of time after the content is posted to the page on the social network; and
predicting future user interactions with the content posted to the page on the social network during at least one subsequent duration of time by applying the parameters and the accessed user interactions to a prediction model, the future user interactions comprising at least one of viewing the content, clicking on the content, commenting on the content, replying to responses to the content, liking the content, disliking the content, loving the content, sharing the content, or retweeting the content.

13. The one or more computer-readable storage media of claim 12, wherein the predicting future user interactions with the content posted to the page on the social network further comprises:
   determining, using the prediction model, a probability of a user interacting with the content posted to the page on the social network during the at least one subsequent duration of time based at least in part on the accessed user interactions with the content during the initial duration of time; and
   predicting, using the prediction model, a number of future user interactions with the content during the at least one subsequent duration of time as a function of the population parameter and a probability of the user getting infected during each respective subsequent duration of time.

14. The one or more computer-readable storage media of claim 12, wherein the prediction model comprises a recursive algorithm.

15. The one or more computer-readable storage media of claim 12, wherein the at least one subsequent duration of time comprises an amount of time that is equivalent to an amount of time in the initial duration of time.

16. The one or more computer-readable storage media of claim 12, wherein the predicting further comprises predicting future user interactions with the content during at least nine subsequent durations of time.

17. The one or more computer-readable storage media of claim 12, wherein the accessed user interactions comprise at least one of views of the content, clicks on the content, replies to the content, likes of the content, shares of the content, or retweets of the content.

18. A computing device, comprising:
   at least a memory and a processor to implement a prediction model, the prediction model configured to:
      receive a population parameter that indicates a number of users that subscribe to a page on a social network;
      receive user interactions with content posted to the page during an initial duration of time after the content is posted to the page;
      determine a first probability of a user interacting with the content during the initial duration of time based on the received user interactions;
      generate a trend of probabilities of a user interacting with the content during subsequent durations of time;
      determine, from the trend of probabilities, a probability of a user interacting with the content during each of the subsequent durations of time; and
      predict a number of user interactions with the content during each of the subsequent durations of time as a function of the population parameter and the probability of the user interacting with the content at each respective subsequent duration of time, the user interactions comprising at least one of viewing the content, clicking on the content, commenting on the content, replying to responses to the content, liking the content, disliking the content, loving the content, sharing the content, or retweeting the content.

19. The computing device of claim 18, wherein the trend of probabilities is generated using linear extrapolation.

20. The computing device of claim 18, wherein each of the subsequent durations of time comprise an amount of time that is equivalent to an amount of time in the initial duration of time.

21. The computing device of claim 18, wherein the prediction model is further configured to determine, from the trend, the probability of a user interacting with the content during at least nine subsequent durations of time.

* * * * *